(12) United States Patent
Harris

(10) Patent No.: US 11,852,443 B2
(45) Date of Patent: *Dec. 26, 2023

(54) BALLISTIC PANEL AND METHOD OF MAKING A BALLISTIC PANEL

(71) Applicant: The Boeing Company, Chicago, IL (US)

(72) Inventor: John N. Harris, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,012

(22) Filed: Dec. 9, 2019

(65) Prior Publication Data

US 2021/0172710 A1 Jun. 10, 2021

(51) Int. Cl.
*F41H 5/04* (2006.01)
*F41H 5/24* (2006.01)
(Continued)

(52) U.S. Cl.
CPC ............ *F41H 5/0457* (2013.01); *F41H 5/24* (2013.01); *B32B 15/04* (2013.01); *B32B 15/14* (2013.01);
(Continued)

(58) Field of Classification Search
CPC ......... B32B 15/04; B32B 15/08; B32B 15/14; B32B 15/20; B32B 2037/1253; B32B 2250/03; B32B 2250/40; B32B 2255/06; B32B 2260/021; B32B 2260/046; B32B 2262/02; B32B 2262/0261; B32B 2262/0269; B32B 2262/101; B32B 2266/0214; B32B 2266/0271; B32B 2266/0278; B32B 2266/08; B32B 2266/124; B32B 2307/3065; B32B 2307/558; B32B 2307/75; B32B 2571/00;
(Continued)

(56) References Cited

U.S. PATENT DOCUMENTS 4,868,040 A * 9/1989 Hallal ................ B32B 27/04
442/234
6,216,579 B1 4/2001 Boos et al.
(Continued)

FOREIGN PATENT DOCUMENTS

CA 2815878 A1 * 5/2012 ........... F41H 5/0471
CN 1813032 A 8/2006
(Continued)

OTHER PUBLICATIONS

Fu et al. ("Low-Velocity Impact Behavior of a Shear Thickening Fluid (STF) and STF-Filled Sandwich Composite Panels" Composites Science and Technology vol. 165. pp. 74-83. 2018) (Year: 2018).*

(Continued)

*Primary Examiner* — Lynda Salvatore
(74) *Attorney, Agent, or Firm* — MH2 Technology Law Group LLP

(57) ABSTRACT

A ballistic panel is described including a core layer having a first major surface and a second major surface, the core layer including a ballistic gel. The first layer of ballistic resistant material is on the first major surface of the core layer. A second layer of ballistic resistant material is on the second major surface of the core layer.

31 Claims, 6 Drawing Sheets

SECTION A - A

(51) Int. Cl.
*B32B 15/04* (2006.01)
*B32B 15/14* (2006.01)
*B32B 15/20* (2006.01)
*B32B 37/12* (2006.01)

(52) U.S. Cl.
CPC .......... *B32B 15/20* (2013.01); *B32B 37/1207* (2013.01); *B32B 2037/1253* (2013.01); *B32B 2250/03* (2013.01); *B32B 2255/06* (2013.01); *B32B 2262/0261* (2013.01); *B32B 2307/3065* (2013.01); *B32B 2307/558* (2013.01)

(58) Field of Classification Search
CPC ..... B32B 2605/18; B32B 27/12; B32B 27/26; B32B 27/38; B32B 27/40; B32B 3/12; B32B 37/1207; B32B 5/245; B32B 7/12; F41H 5/0457; F41H 5/24; E21D 9/005; E21D 9/0621; E21D 9/0692; E21D 9/093
See application file for complete search history.

(56) References Cited

U.S. PATENT DOCUMENTS

| | | | |
|---|---|---|---|
| 7,381,460 | B2 | 6/2008 | Palmer et al. |
| 8,530,027 | B2 | 9/2013 | Kozar et al. |
| 9,114,589 | B2 | 8/2015 | Wilenski et al. |
| 9,327,458 | B2 | 5/2016 | Rugtvedt et al. |
| 9,857,148 | B2 | 1/2018 | Wilenski et al. |
| 10,160,185 | B2 | 12/2018 | Sexton et al. |
| 11,111,361 | B2 | 9/2021 | Green et al. |
| 2003/0052779 | A1* | 3/2003 | Martin ................. B64C 1/1469 340/541 |
| 2003/0114064 | A1 | 6/2003 | Fu et al. |
| 2003/0189131 | A1 | 10/2003 | Cloud et al. |
| 2007/0144111 | A1* | 6/2007 | Kennedy ................. B32B 3/28 52/783.17 |
| 2007/0238379 | A1 | 10/2007 | Bhatnagar et al. |
| 2015/0260483 | A1 | 9/2015 | Wibby et al. |
| 2015/0323291 | A1* | 11/2015 | Endres ............... B32B 37/0076 89/36.01 |
| 2016/0221303 | A1 | 8/2016 | Jancar et al. |
| 2018/0334020 | A1* | 11/2018 | Garnick ................. B60J 11/04 |
| 2021/0172711 | A1* | 6/2021 | Harris ................. F41H 5/0492 |

FOREIGN PATENT DOCUMENTS

| | | | |
|---|---|---|---|
| CN | 206274239 U | * 6/2017 | ............ B32B 17/12 |
| WO | 2015/043559 A1 | 4/2015 | |

OTHER PUBLICATIONS

Hexcel (HexWeb® HRH-10 Product Data Sheet) https://dhsutherland.com/wp-content/uploads/2019/06/HexWeb-HRH-10.pdf (Year: 2017).*
Gurgen ("An Investigation on Composite Laminates Including Shear Thickening Fluid Under Stab Condition" Journal of Composite Materials vol. 53(8). pp. 1111-1122. 2018) (Year: 2018).*
Hexcel ("HexPly® Prepreg Technology", 2013). https://ethz.ch/content/dam/ethz/special-interest/mavt/design-materials-fabrication/composite-materials-dam/Education/Manufacturing_of_Polymer_Composites/FS2017/Prepreg_Technology.pdf (Year: 2013).*
Keil (Technology and Practical Use of Strain Gages—With Particular Consideration of Stress Analysis Using Strain Gages—3.2.4 Epoxy Adhesives. John Wiley & Sons. 2017). (Year: 2017).*
Chen et al. Espacenet Translation (Year: 2017).*
"On, prep." OED Online. Oxford University Press, Sep. 2021. Web. Nov. 20, 2021. (Year: 2021).*
Moita et al. (Fig. 1. Sandwich plate. From "Buckling and geometrically nonlinear analysis of sandwich structures", International Journal of Mechanical Sciences, vol. 92, pp. 154-161, 2015) from https://shellbuckling.com/presentations/sandwiches/pages/page_11.html (Year: 2015).*
AeroDefenseTech ("Using Thermoplastic Composites for Aerospace Applications", 2017) from https://www.aerodefensetech.com/component/content/article/adt/features/articles/27952 (Year: 2017).*
Extended European Search Report dated Mar. 29, 2021 in corresponding European Application No. 20212223.0, 6 pages.
Zornig et al. (Armor Plate Ballistic Testing, Watertown Arsenal Laboratory Report No. WAL 710/685, Aug. 2, 1944) https://apps.dtic.mil/dtic/tr/fulltext/u2/a954928.pdf (Year: 1944).
Hazell et al. ("The Impact of Structural Composite Materials Part 1: Ballistic Impact," J Strain Analysis vol. 47(7). pp. 396-405. 2012). (Year: 2012).
Communication Pursuant to Article 94(3) EPC dated Mar. 1, 2023 in related European Application No. 20212223.0, 5 pages.
First Notification of Office Action dated Aug. 19, 2023 in related Chinese Application No. 2020144259801, 19 pages (includes English translation of Office Action).
Second Notification of Office Action dated Sep. 28, 2023 in related Chinese Application No. 202014425980.1, 20 pages (includes English translation of Office Action).

* cited by examiner

SECTION A - A

SECTION A - A

SECTION A - A

SECTION A - A

BALLISTIC PANEL AND METHOD OF MAKING A BALLISTIC PANEL

DETAILED DESCRIPTION

Field of the Disclosure

The present disclosure is directed to a ballistic panel and method of making the ballistic panel.

BACKGROUND

Ballistic panels are often used in applications where bullet proofing is desired. A conventional ballistic panel includes a multi-ply laminate of Kevlar fabric in a non-symmetric panel construction as shown in FIG. 1. A single paper honeycomb core 10 about 1 inch thick is employed in the multi-ply laminate. The paper includes a set of meta-aramid fibers that are pressed together. Across each sheet of the meta-aramid paper a series of horizontal rows of epoxy adhesive are laid down. Then the sheets are stacked on top of each other and cured. The gaps between each bond line are then expanded to create the hexagonal shaped cells. Typically, the cells are hollow (e.g., filled with air). A 28-ply Kevlar laminate 20 with a cured epoxy resin impregnated therein is adhered to one side of the honeycomb core 10 with an adhesive layer 30. Aluminum face sheets 40 are adhered to the honeycomb core 10 and the Kevlar laminate 20 with additional adhesive layers 30. The ballistic panel of FIG. 1 is known for use in, for example, aircraft cabin doors to protect the pilots from terrorist threats.

The current panel of FIG. 1, in embodiments, meets ballistic and stiffness requirements. However, because known ballistic panels are not symmetric, they therefore suffer from warping during heat cure. Cold bonding methods can be used for fabricating the ballistic panels of FIG. 1 in order to reduce warping. However, such cold bonding methods can increase the time to manufacture the panel and increase scrap rates compared to hot bonding methods of manufacture that are performed at higher temperatures.

Thus, there is a need in the art for materials and processes that can provide a ballistic panel that can be manufactured with reduced warping and less scrap while employing hot bonding methods.

SUMMARY

The present disclosure is directed to a ballistic panel. The ballistic panel comprises a core layer having a first major surface and a second major surface, the core layer comprising a ballistic gel. The first layer of ballistic resistant material is on the first major surface of the core layer. A second layer of ballistic resistant material is on the second major surface of the core layer.

The present disclosure is also directed to a method of making a ballistic panel. The method comprises providing a core layer having a first major surface and a second major surface, the core layer comprising a ballistic gel. A first layer of ballistic resistant material is attached on the first major surface of the core layer. A second layer of ballistic resistant material is attached on the second major surface of the core layer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
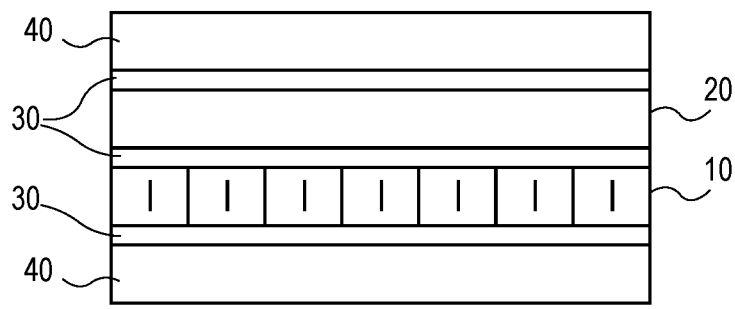
FIG. 1 illustrates a cross-sectional schematic view of a conventional ballistic panel that employs a multi-ply laminate of Kevlar fabric in a non-symmetric panel construction.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The ballistic panel, as shown in FIG. 1, exhibits warping during manufacture using hot bonding methods due to the differences in the Coefficient of Thermal Expansion (CTE) of the panel components. This can result in lost time and expense to repair the warped panel, or potentially may result in scrapping the panel altogether. Further, the warping of the panel often results in some form of dis-bonding of the panel components. Once dis-bonding occurs the panel loses much of the key mechanical properties for which it was designed, such as, for example, a significant reduction in flexural strength. Warping of composite panels can occur due to a non-symmetric stacking of panel components that are heated and subsequently cooled. In this case, the non-symmetry is due, in part, to the large multi-ply KEVLAR ballistic laminate 20, which is used to meet ballistic specifications of the panel, and which is only stacked on one side of the honeycomb core. Unfortunately redistributing the plies of Kevlar fabric into two smaller, separate laminates that are symmetrically distributed about the honeycomb core 10 will not meet ballistic specifications without further modifications. Furthermore, symmetrically adding another laminate (e.g., a replicate of ballistic laminate 20) to the construction may reduce warping but would greatly increase weight, which increases fuel consumption of airplanes in which the panel is employed. This in turn adds significant cost to airline customers.

The symmetric designs of the ballistic panels of the present disclosure reduce warping to within acceptable levels while still allowing fabrication by the hot bonding method. Hot bonding employs relatively high temperatures, such as, for example, above 200° F., such as from about 220° F. to about 500° F., which can increase production rates. In an example, the hot bonding can occur at temperatures of from about 275° F. to about 300° F. for 25-30 minutes at 80 PSI. A core layer comprising, for example, cells filled with ballistic gel, or other core layer materials as described herein, is adhered between two separate multi-ply laminates of ballistic resistant material to provide for a single, cohesive laminate structure that achieves desired ballistic protection. In an embodiment, the core layer comprising cells filled with ballistic gel has a lower density than, for example, a Kevlar laminate, thereby providing a relatively lightweight ballistic material.

Figure 2:
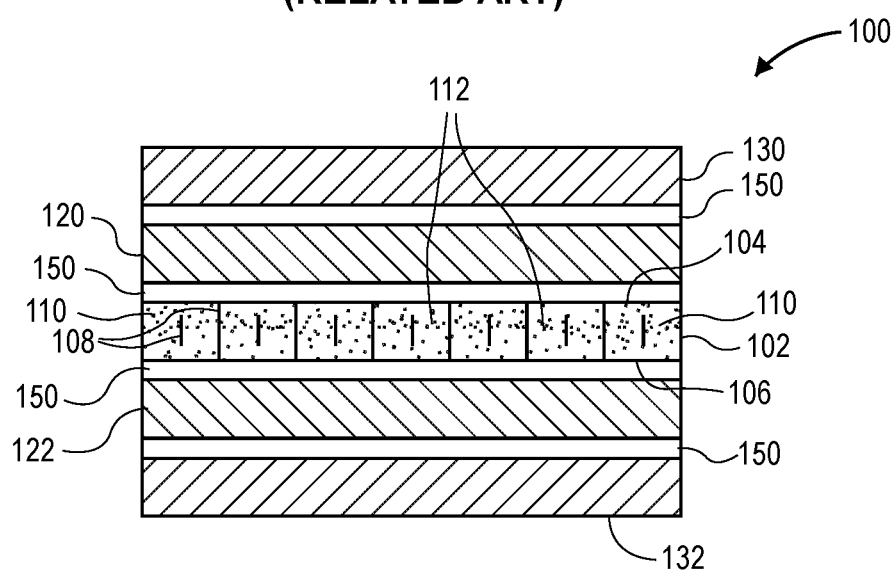
FIG. 2 illustrates a cross-sectional schematic view of a ballistic panel, according to the present disclosure.

FIG. 2 illustrates an example of a ballistic panel 100, according to the present disclosure. The ballistic panel comprises a core layer 102 having a first major surface 104 and a second major surface 106. The core layer 102 includes a cell wall 108 structured to provide a plurality of cells 110. A ballistic gel 112 is embedded within the plurality of cells 110 to form a cellular core layer. A first layer of ballistic resistant material 120 is disposed on the first major surface 104 of the core layer 102. A second layer of ballistic resistant material 122 is disposed on the second major surface 106 of the core layer 102. The ballistic gel acts as a second ballistic material that bridges the gap between the two relatively thin layers of ballistic material 120, 122.

Figure 3:
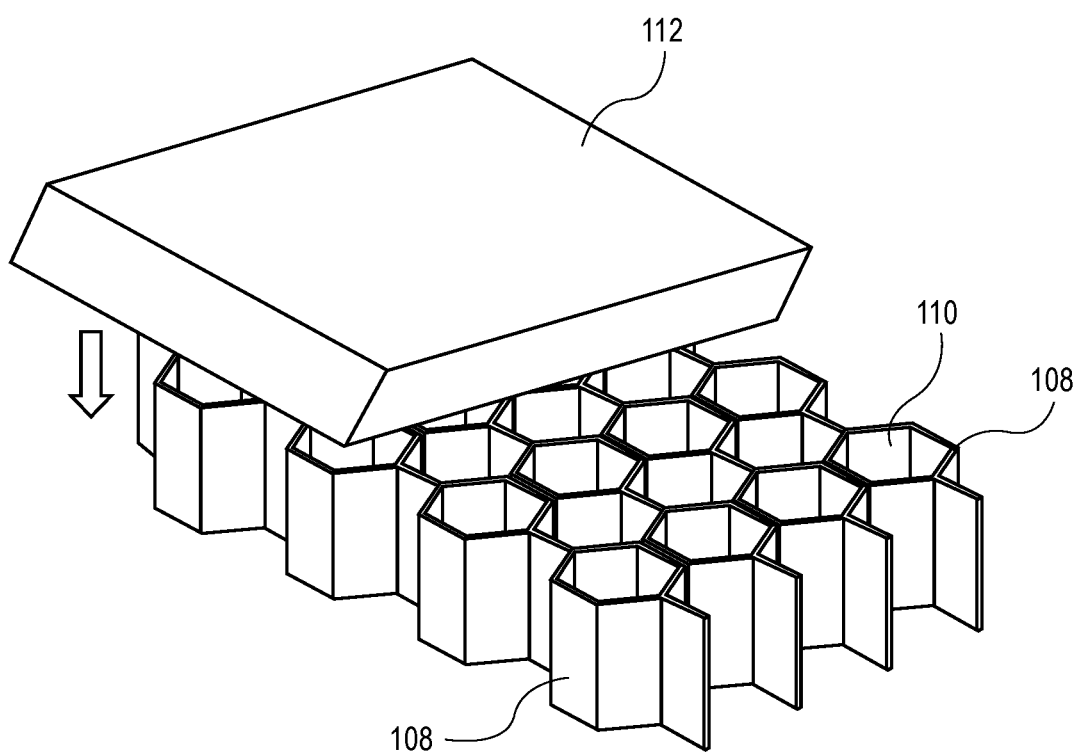
FIG. 3 illustrates a perspective view of a cell wall forming a plurality of empty cells and a ballistic gel layer prior to being incorporated into the cells to form a cellular core layer, according to the present disclosure.

FIG. 3 illustrates a perspective view of a cell wall 108 before the ballistic gel 112 has been introduced into the cells 110. Cells 110 can have any suitable shape, such as a honeycomb shape having a hexagonal cross-section, as illustrated in FIG. 3. Other examples include cells with square, rectangular or other polygonal cross-sections. The cell wall 108 can comprises any material suitable for containing the ballistic gel 112 in a ballistic resistant structure. An example of a suitable material is paper comprising a set of meta-aramid fibers that are pressed together. The cell wall material 108 can be fabricated by applying an epoxy adhesive across a plurality of sheets of the meta-aramid paper in a series of horizontal rows. The sheets are stacked on top of each other and the adhesive is cured. The gaps between each bond line are then expanded to create the hexagonal shaped cells. An example of a commercially available fabric comprising meta-aramid fibers that is suitable for making the cell wall 108 is NOMEX®, which is available from DuPont, of Midland, Mich. In NOMEX, the aromatic groups are all linked to the backbone chain at the 1 and 3 positions, as shown in Formula 1, below, where "n" is the number of repeat units. This is called meta-linkage.

(1)

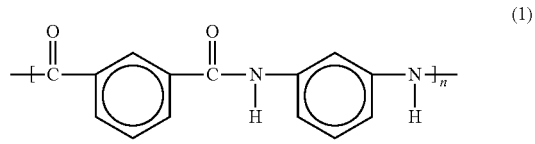

The ballistic gel 112 can be any dilatant, non-newtonian fluid that has the property of exhibiting an increase in rigidity when impacted by a bullet. An example of such a ballistic gel is D3O™ gel, commercially available from D3O Labs of London, United Kingdom. D3O is an energy-absorbing gel material comprising polyurethane and polyborodimethylsiloxane. The D3O can be in the form of a foam, such as closed cell polyurethane foam composite comprising polyborodimethylsiloxane (PBDMS) as the dilatant dispersed through the foam matrix.

The cell walls 108 provide little or no ballistic resistance without the D3O gel, but do impart stiffness to the composite panel. The core layer 102 can have any thickness that provides the desired ballistic resistance. As an example, the core layer can have a thickness ranging from about 0.2 inch to about 5 inches, such as from about 0.5 inch to about 2 inches, or from about 0.5 inch to about 1 inch.

Both the first layer of ballistic resistant material 120 and the second layer of ballistic resistant material 122 can comprise any suitable ballistic resistant material. An example of a suitable material is para-aramid fibers, such as KEVLAR (poly paraphenylene terephthalamide) fibers, woven into a fabric and impregnated with a curable resin. In the KEVLAR fibers, the aromatic groups are all linked to the backbone chain at the 1 and 4 positions, as shown in Formula 2, below, where "n" is the number of repeat units. This is called a para-linkage.

(2)

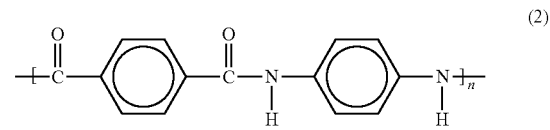

Multiple layers, or plys, of the resin impregnated KEVLAR fiber fabric can be laminated together with the resin and cured. For example, from about 5 to about 20 plys, such as from about 10 to about 20 plys, or from about 10 to about 15 plys of resin impregnated fabric can be included in each of the first layer of ballistic resistant material 120 and the second layer of ballistic resistant material 122. The resin can be any suitable curable resin that is suitable for such pre-impregnated laminates, such as an epoxy resin. The resins can be low heat release resins, including thermosetting resins such as phenolic resin, benzoxazine resins, and cyanate ester based resins. Thermoplastic resins such as Polyether ether ketone (PEEK), Polyetherketoneketone (PEKK), Polyphenylsulfone (PPSU), Polyphenylene sulfide (PPS), and Polyetherimide (PEI) resins can also be used.

The first layer of ballistic resistant material 120 and the second layer of ballistic resistant material 122 can each have a thickness ranging from about 0.1 inch to about 0.5 inch, such as from about 0.2 inch to about 0.4 inch.

The ballistic panel of FIG. 2 further comprises a first face sheet 130 on the first layer of ballistic resistant material 120 and a second face sheet 132 on the second layer of ballistic resistant material 122. As an example, the first face sheet 130 and the second face sheet 132 each comprise aluminum, such as pure aluminum (e.g., 99% by weight of Al or more) or aluminum alloys. The face sheet provides flexure stiffness along with the core. Additionally, face sheets comprising aluminum have properties that may aid in stopping bullets or shrapnel.

The first face sheet 130 and the second face sheet 132 can have any desired thickness. Examples of suitable thickness range from about 0.005 inch to about 0.04 inch, such as from about 0.01 inch to about 0.03 inch.

Figure 4:
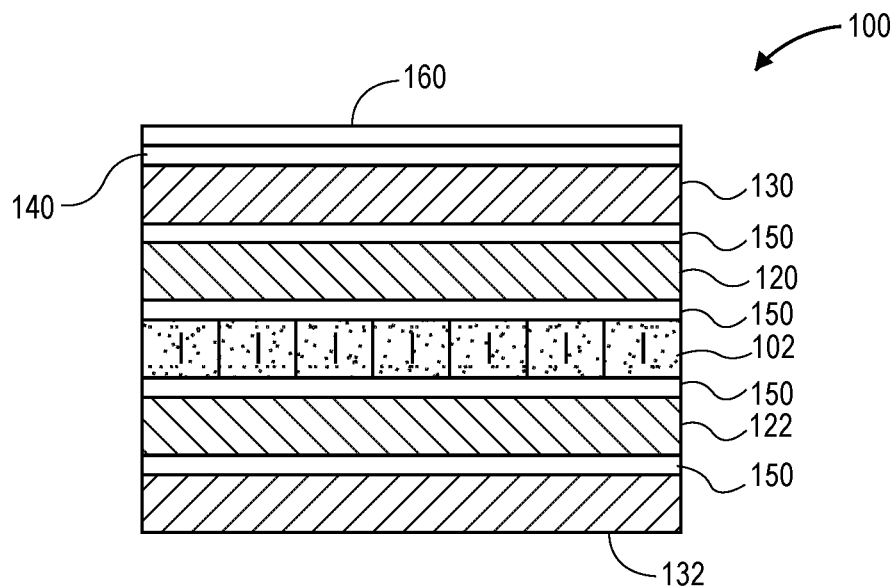
FIG. 4 illustrates a cross-sectional schematic view of a ballistic panel, according to the present disclosure.

FIG. 4 illustrates a ballistic panel 100 that is similar to that described above with respect to FIG. 2, except that the ballistic panel 100 of FIG. 4 includes an intumescent layer 140 and a decorative layer 160 on the first face sheet 130. The intumescent layer 140 functions to provide fire resistance to the ballistic panel 100. The intumescent layer comprises intumescent materials that can be, for example, organic material formulations that create a foam in the presence of heat. Example temperatures at which the intumescent materials activate to form a foam are about 250° F. to about 450° F. The foam acts as a thermal barrier against heat penetration in the event of a fire. The D3O gel will most likely not have the same flammability properties as the aramid core into which the gel is incorporated, and the intumescent materials can aid in providing a desired level of fire resistance to the panel. Examples of a commercially available intumescent material is VERSACHAR® resin, which is a thermoplastic intumescent layer available from, for example, FlameOFF Coatings, Inc. of Raleigh, N.C. or Ed Gregor and associates of South Carolina. In another embodiment, a fabric can be pre-impregnated with an intumescent polymer, such as VERSACHAR®. This would incorporate nicely into a composite stack where one or more plies of the pre-impregnated fabric (prepreg) can be disposed on the outside surface of the ballistic laminate. The intumescent layer 140 can have any suitable thickness. As an example, the intumescent layer 140 has a thickness ranging from about 0.001 inch to about 0.1 inch, such as from about 0.002 inch to about 0.01 inch.

The decorative layer 160 can be disposed on the ballistic panel 100. Such decorative layers can include, for example, wall paper, paint, logos or any other desired layer applied to enhance visual appearance of the panel. Such decorative layers 160 can optionally be applied to any of the ballistic panels described herein.

Figure 5:
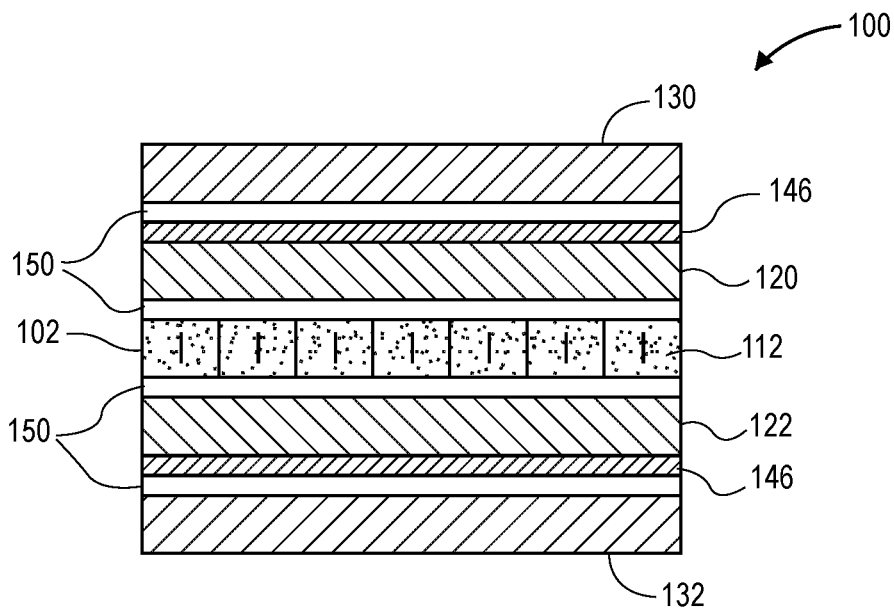
FIG. 5 illustrates a cross-sectional schematic view of a ballistic panel, according to the present disclosure.

FIG. 5 illustrates a ballistic panel 100 that is similar to that of FIG. 2, except that the ballistic panel 100 includes a first fire retardant layer 146 between the first layer of ballistic resistant material 120 and the first face sheet 130 and a second fire retardant layer 146 between the second layer of ballistic resistant material 122 and the second face sheet 132. The fire retardant layers can comprise one or more layers, such as about 1 to about 10 layers, or about 1 to about 5 layers, or about 1 to about 3 layers, of fabric impregnated with a fire retardant. The fabric can be a ballistic resistant material, such as woven para-aramid fibers (e.g., KEVLAR® or other fabric). Any suitable fire retardant material can be employed, such as any of the intumescent materials described herein. Examples of a commercially available intumescent material is VERSACHAR® resin, which is a thermoplastic intumescent layer available from FlameOFF Coatings, Inc., of Raleigh, N.C. In an alternative example, the fire retardant layers 146 can comprise the intumescent material impregnated into a fiberglass fabric. In yet another example, the fire retardant layers 146 can comprise the intumescent material without a fabric or fibers (e.g., a layer of the intumescent material alone).

One or more of the layers of the ballistic panel 100 can be attached together using adhesive layers. For example, a first adhesive layer 150 can adhere the first layer of ballistic resistant material 120 to the core layer 102 and a second adhesive layer 150 can adhere the second layer of ballistic resistant material 122 to the core layer 102. Other adhesive layers 150 can be used to adhere the face sheets 130, 132 to the ballistic panel 100. Any suitable adhesive material that provides sufficient bonding between the layers can be employed. Examples include urethane adhesives and epoxy adhesives.

Other implementations of the ballistic panels of the present disclosure are contemplated. As examples, instead of the cellular core layers discussed above for the core layers 102 of FIGS. 2, 4 and 5, the core layer can be other types of layers comprising a ballistic gel, such as a ballistic gel layer made without the cell walls 108 structured to provide the plurality of cells 110. For example, the core layer can be a layer of ballistic gel foam alone. Examples of suitable ballistic gel foam materials are known in the art, such as the D3O™ material described herein. An example of such an implementation is illustrated in FIG. 6, which shows a schematic cross-sectional view of a ballistic panel including the core layer 102 comprising a ballistic gel foam without cell walls 108.

Figure 6:
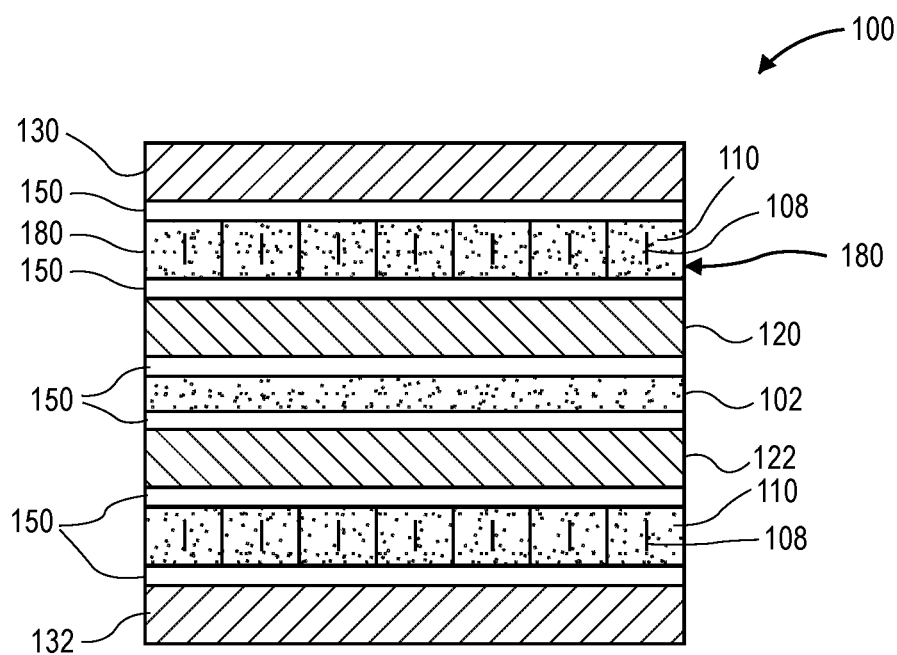
FIG. 6 illustrates a cross-sectional schematic view of a ballistic panel, according to the present disclosure.
Figure 7:
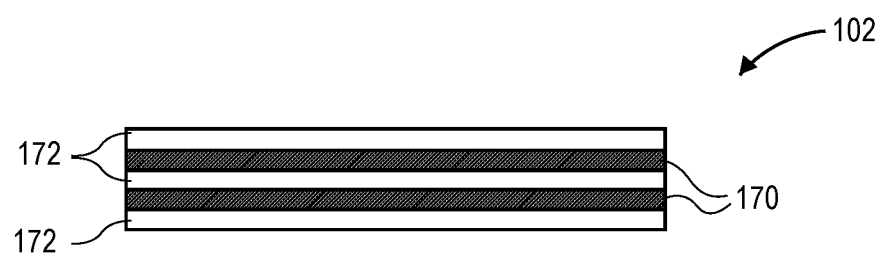
FIG. 7 illustrates a cross-sectional schematic view of a laminate structure that can be included as the core layer in the ballistic panel of FIG. 6, according to the present disclosure.

In yet another implementation, the core layer 102 of the ballistic panel of FIG. 6 is a laminate structure comprising multiple plies of ballistic resistant material and one or more layers of ballistic gel. An example of such a laminate structure is shown in FIG. 7, which includes sheets of a ballistic resistant material 170 and one or more layers of ballistic gel 172 positioned between the sheets of ballistic resistant material 170 and bonded thereto by any suitable means, such as by using an adhesive (not shown). The ballistic resistant material can be, for example, para-aramid fibers, such as KEVLAR (poly paraphenylene terephthalamide) fibers, woven into a fabric. In the core layer 102 of FIG. 7, the para-aramid fiber fabric may or may not be impregnated with a curable resin. The ballistic gel can be a ballistic gel foam, such as, for example, layers of the D3O material described herein. The laminate structure of FIG. 7 can be included as the core layer 102 in the ballistic panel 100 of FIG. 6.

The ballistic panel 100 of FIG. 6 also includes layers of ballistic resistant material 120, 122; face sheets 130, 132 and adhesive layers 150 for bonding the layers together. The layers of ballistic resistant material 120, 122; face sheets 130, 132 and adhesive layers 150 can be the same as those described above with respect to FIG. 2. In addition, the ballistic panel 100 includes cellular layers 180 and 182. The cellular layers 180, 182 comprise cell walls 108 that form cells 110, and which are the same as described above with respect to FIG. 3, except that the cells 110 are filled with a gas, such as air, instead of a ballistic gel. The cellular layers 180, 182 are bonded to adjacent layers using a suitable adhesive 150.

The ballistic panels of the present disclosure can be employed in any desired application for which ballistic protection is desired. Examples of such applications include bullet proofing of aircraft, aerospace and other vehicles or structures used for military purposes. Other examples include ballistic resistant door panels employed between the passenger compartment and cabins of commercial aircraft as an anti-terrorism measure, and other applications in which relatively light weight ballistic protection is desired.

Figure 8:
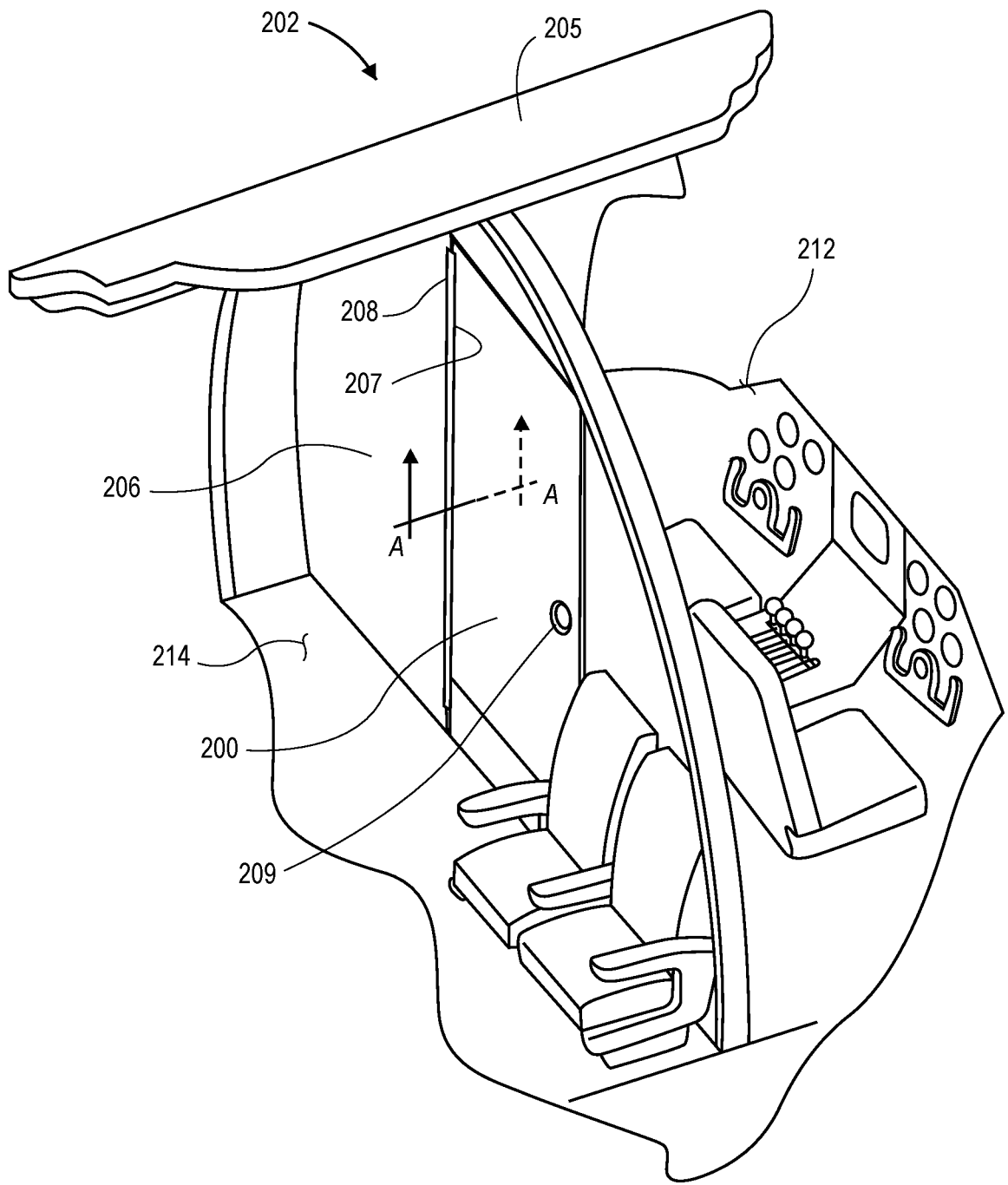
FIG. 8 illustrates a ballistic resistant door of an aircraft, according to the present disclosure.

An example of a ballistic resistant door 200 of an aircraft 202 is shown in FIG. 8. Aircraft 202 includes an exterior skin 205 defining a fuselage. The inside of the aircraft 202 includes a flight deck wall 206 including the ballistic resistant door 200, which can be, for example, a flight deck door. The flight deck wall 206 and ballistic resistant door 200 separate the flight deck area or side 212 from the passenger area or side 214. The ballistic resistant door 200 allows restricted access to the flight deck side 212 from the passenger side 214. The ballistic resistant door 200 may also be used as a door at other locations within the fuselage if desired. Generally, the ballistic resistant door 200 is formed to fit into a door jam in the flight deck wall 206. One side the ballistic resistant door 200 includes a hinge 207 which mates with a hinge 208 of the door jam. This allows the ballistic resistant door 200 to be easily opened and closed. Also, the ballistic resistant door 200 includes a door latch or locking mechanism 209. The locking mechanism 209 mates with a jam locking mechanism (not shown) on the door jam to lock the ballistic resistant door 200 in a closed position.

Figure 9:
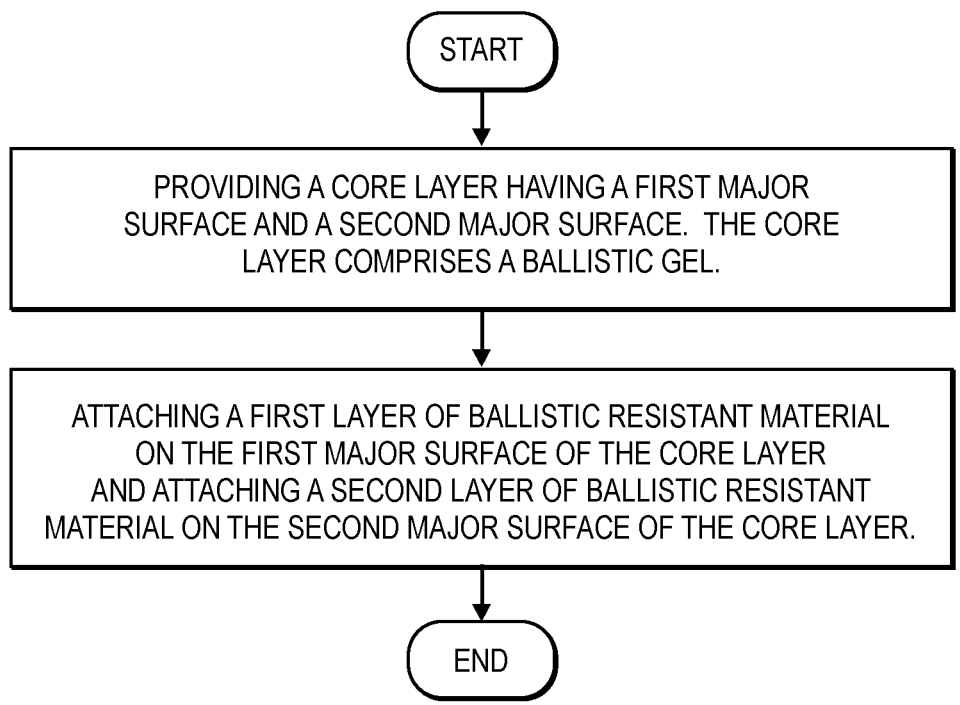
FIG. 9 illustrates a flow diagram of a method of making a ballistic panel, according to the present disclosure.

Referring to FIG. 9, the present disclosure is also directed to a method of making a ballistic panel. The method comprises providing a core layer having a first major surface and a second major surface. The core layer comprises a ballistic gel. A first layer of ballistic resistant material is attached on the first major surface of the core layer. A second layer of ballistic resistant material is attached on the second major surface of the core layer. The core layer and layers of ballistic resistant material can be any of those layers as described herein above.

The method can optionally include attaching additional layers to the ballistic panel. For example, the method can optionally include attaching a first face sheet on the first layer of ballistic resistant material and a second face sheet on the second layer of ballistic resistant material. As another example, the method can optionally further include attaching one or more layers of para-aramid fibers woven into a fabric and impregnated with a fire retardant. As yet another example, the method can optionally further include applying an intumescent layer that can act as a fire retardant on the first face sheet and/or the second face sheet. As another example, the method can optionally comprise attaching a first cellular layer to the first layer of ballistic resistant material prior to attaching the first face sheet and attaching a second cellular layer to the second layer of ballistic resistant material prior to attaching the second face sheet, the first cellular layer and the second cellular layer both comprising cell walls that form a plurality of cells, the plurality of cells being filled with a gas. The first face sheet can be attached to the first cellular layer and the second face sheet can be attached to the second cellular layer, similarly as illustrated in FIG. 6. Any of the layers of face sheets, layers of para-aramid fibers woven into a fabric and impregnated with a fire retardant, intumescent layers, decorative layers or cellular layers described herein can be employed in the methods of the present disclosure.

The core layer 102 can be a cellular core layer manufactured by incorporating a ballistic gel 112 into a plurality of cells 110 formed by cell wall 108, as shown in FIG. 3. For example, the ballistic gel 112 under slowly applied pressure acts as a liquid and can be embedded into the honeycomb core cells. The pressure for embedding the ballistic gel 112 may be applied by gravity or other suitable techniques.

One or more of the layers of the ballistic panel 100 can be adhered together using adhesive layers, as described above. For example, the method can include adhering the first layer of ballistic resistant material 120 to the core layer 102 and adhering the second layer of ballistic resistant material 122 to the core layer 102 using adhesive layers 150. Other adhesive layers 150 can be used to adhere the face sheets 130, 132 to the ballistic panel 100. The adhering process can be performed by a hot bonding method, which employs heating to cure the adhesion layers 150, such as at any of the hot bonding temperatures described herein. While hot bonding methods are preferred because they save process time compared to cold process techniques, cold bonding methods can also be employed if desired. Both hot bonding and cold bonding techniques are generally well known in the art.

The intumescent layer 140 can be applied to the face sheets 130, 132 by any suitable layer technique. Suitable layer techniques are well known in the art and could be selected by one of ordinary skill in the art. A primer (not shown) can be applied to the face sheet(s) prior to applying the intumescent layer 140. The primer aids in providing satisfactory adhesion between the intumescent layer 140 and the face sheets.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A ballistic panel, comprising:
   a core layer having a first major surface and a second major surface, the core layer comprising a ballistic gel, the ballistic gel comprising polyurethane and polyborodimethylsiloxane (PBDMS);
   a first layer of ballistic resistant material on the first major surface of the core layer;
   a second layer of ballistic resistant material on the second major surface of the core layer;
   a first face sheet on the first layer of ballistic resistant material; and
   a second face sheet on the second layer of ballistic resistant material,
   wherein the first layer of ballistic resistant material and the second layer of ballistic resistant material comprise para-aramid fibers impregnated with a cured resin, comprising a resin selected from the group consisting of benzoxazine, polyether ether ketone (PEEK), polyetherketoneketone (PEKK), polyphenylsulfone (PPSU), polyphenylene sulfide (PPS), and polyetherimide (PEI).

2. The ballistic panel of claim 1, wherein the core layer is a cellular core layer comprising a cell wall structured to provide a plurality of cells, the ballistic gel being embedded within the plurality of cells.

3. The ballistic panel of claim 2, wherein the cell wall comprises para-aramid fibers.

4. The ballistic panel of claim 1, wherein the ballistic gel is a non-newtonian fluid that has a property of exhibiting an increase in rigidity when impacted by a bullet.

5. The ballistic panel of claim 1, wherein the core layer has a thickness ranging from about 0.2 inch to about 5 inches.

6. The ballistic panel of claim 1, wherein the first layer of ballistic resistant material and the second layer of ballistic resistant material each have a thickness ranging from about 0.1 inch to about 0.5 inch.

7. The ballistic panel of claim 1, further comprising a first adhesive layer and a second adhesive layer, the first adhesive layer adhering the first layer of ballistic resistant material to the first major surface of the core layer and the second adhesive layer adhering the second layer of ballistic resistant material to the second major surface of the core layer.

8. The ballistic panel of claim 1, where the first face sheet and the second face sheet each comprise aluminum.

9. The ballistic panel of claim 1, wherein the first face sheet and the second face sheet each have a thickness ranging from about 0.005 inch to about 0.04 inch.

10. The ballistic panel of claim 1, further comprising an intumescent layer on the first face sheet.

11. The ballistic panel of claim 10, wherein the intumescent layer has a thickness ranging from about 0.001 inch to about 0.1 inch.

12. The ballistic panel of claim 1, further comprising fire retardant layers chosen from i) one or more layers of fabric comprising para-aramid fibers impregnated with a fire retardant; ii) a layer comprising fiberglass fabric impregnated with intumescent material; and iii) a layer of intumescent material alone.

13. The ballistic panel of claim 1, further comprising a decorative layer on the first layer of ballistic resistant material.

14. The ballistic panel of claim 1, further comprising a first cellular layer adhered to the first layer of ballistic resistant material and a second cellular layer adhered to the second layer of ballistic resistant material, the first cellular layer and the second cellular layer both comprising cell walls that form a plurality of cells, the plurality of cells being filled with a gas.

15. The ballistic panel of claim 14, wherein the core layer is a laminate structure comprising multiple plies of ballistic resistant material and one or more layers of the ballistic gel.

16. The ballistic panel of claim 14, wherein the polyurethane is a closed cell polyurethane foam matrix and the polyborodimethylsiloxane (PBDMS) is dispersed through the closed cell polyurethane foam matrix.

17. An aircraft door comprising the ballistic panel of claim 1.

18. A method of making a ballistic panel, the method comprising:
providing a core layer having a first major surface and a second major surface, the core layer comprising a ballistic gel, the ballistic gel comprising polyurethane and polyborodimethylsiloxane (PBDMS);
attaching a first layer of ballistic resistant material on the first major surface of the core layer;
attaching a second layer of ballistic resistant material on the second major surface of the core layer;
attaching a first face sheet on the first layer of ballistic resistant material; and
attaching a second face sheet on the second layer of ballistic resistant material,
wherein the first layer of ballistic resistant material and the second layer of ballistic resistant material comprise para-aramid fibers impregnated with a cured or curable resin,
wherein the cured or curable resin is selected from the group consisting of benzoxazine, polyether ether ketone (PEEK), polyetherketoneketone (PEKK), polyphenylsulfone (PPSU), polyphenylene sulfide (PPS), and polyetherimide (PEI).

19. The method of claim 18, wherein the core layer is a cellular core layer comprising a cell wall structured to provide a plurality of cells, the ballistic gel being embedded within the plurality of cells.

20. The method of claim 19, wherein the cell wall comprises para-aramid fibers.

21. The method of claim 18, wherein the ballistic gel is a non-newtonian fluid that has a property of exhibiting an increase in rigidity when impacted by a bullet.

22. The method of claim 18, further comprising attaching one or more layers of fabric comprising para-aramid fibers impregnated with a fire retardant between the first layer of ballistic resistant material and the first face sheet, and attaching one or more layers of fabric comprising para-aramid fibers impregnated with a fire retardant between the second layer of ballistic resistant material and the second face sheet.

23. The method of claim 18, wherein the ballistic panel is made by a hot bonding method at temperatures of above 200°F.

24. The method of claim 18, further comprising applying an intumescent layer on the first face sheet.

25. The method of claim 18, further comprising attaching a first cellular layer to the first layer of ballistic resistant material prior to attaching the first face sheet, and attaching a second cellular layer to the second layer of ballistic resistant material prior to attaching the second face sheet, the first cellular layer and the second cellular layer both comprising cell walls that form a plurality of cells, the plurality of cells being filled with a gas.

26. The method of claim 18, wherein the first layer of ballistic resistant material and the second layer of ballistic resistant material each comprise a number of plys of fiber fabric, the number of plys ranging from about 5 to about 20.

27. The ballistic panel of claim 1, wherein the cured resin is a thermoset resin.

28. The ballistic panel of claim 1, wherein the cured resin is a thermoplastic resin.

29. The ballistic panel of claim 1, wherein the cured resin is an epoxy.

30. The ballistic panel of claim 12, wherein the fire retardant layers comprise one or more layers comprising fiberglass fabric impregnated with intumescent material.

31. The method of claim 18, further comprising attaching one or more layers of fabric comprising fiberglass fabric impregnated with intumescent material between the first layer of ballistic resistant material and the first face sheet, and attaching one or more layers of fabric comprising fiberglass fabric impregnated with intumescent material between the second layer of ballistic resistant material and the second face sheet.

* * * * *